L. COATALEN AND H. C. M. STEVENS.
CLUTCH FOR POWER TRANSMISSION.
APPLICATION FILED JUNE 21, 1920.
1,400,265.
Patented Dec. 13, 1921.
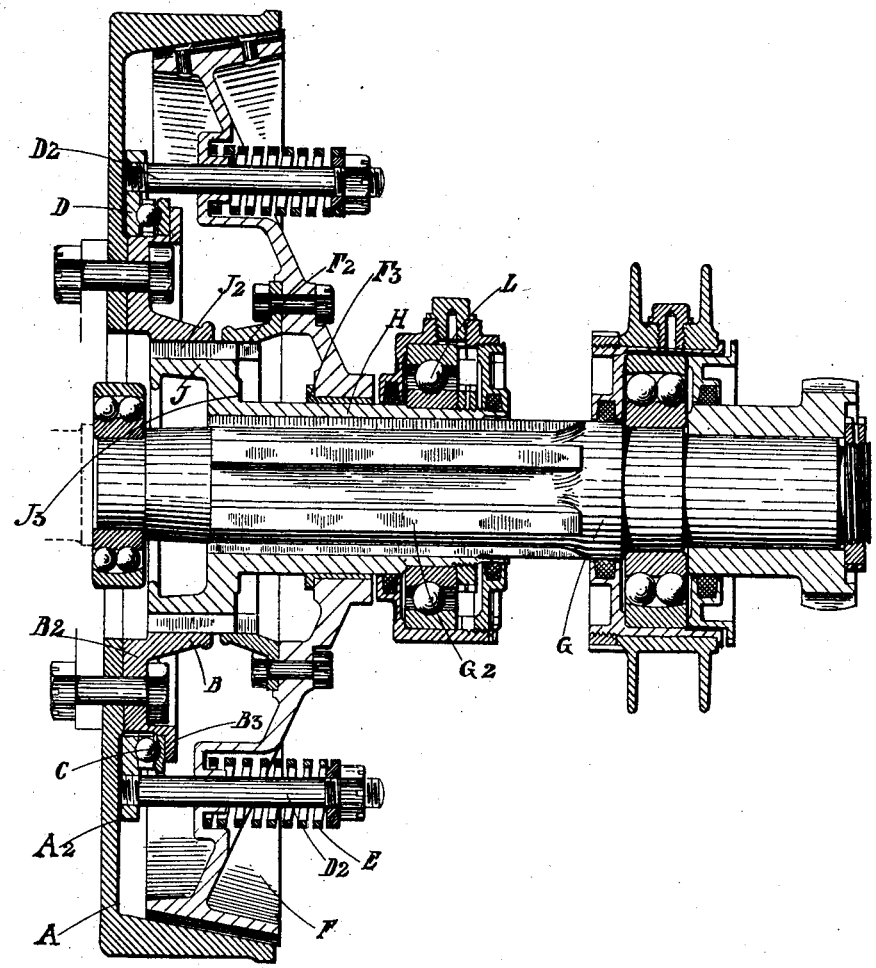
INVENTORS:
Louis Coatalen,
Herbert C. M. Stevens,
By Spear, Middleton, Donaldson & Hall
ATTORNEY

UNITED STATES PATENT OFFICE.

LOUIS COATALEN AND HERBERT CHARLES MACLEOD STEVENS, OF WOLVERHAMPTON, ENGLAND, ASSIGNORS OF ONE-HALF TO SUNBEAM MOTOR CAR COMPANY, LIMITED, OF WOLVERHAMPTON, ENGLAND.

CLUTCH FOR POWER TRANSMISSION.

1,400,265.  Specification of Letters Patent.  Patented Dec. 13, 1921.

Application filed June 21, 1920. Serial No. 390,601.

*To all whom it may concern:*

Be it known that we, LOUIS COATALEN and HERBERT CHARLES MACLEOD STEVENS, both subjects of the King of England, and residing at Wolverhampton, in the county of Stafford, England, have invented certain new and useful Improvements in Clutches for Power Transmission, of which the following is a specification.

This invention relates to combined friction and positive clutches and it has for its object to provide a very simple construction.

According to this invention, the sliding positive clutch member, in addition to engaging the fixed (*i. e.*, non-sliding) positive clutch member, is also permanently in rotative engagement with the movable friction clutch member and is adapted to engage and withdraw the latter after it has disengaged the fixed positive member.

The latter is formed upon or is attached to the fixed frictional member.

The manner of carrying out the invention as applied to the transmission gearing of a motor boat is illustrated in the accompanying drawing, which shows a longitudinal section.

In this construction, the fixed or non-sliding friction member A is the driving element, and it has bolted to it a sleeve B which is internally toothed or splined, and forms the fixed (or non-sliding) positive clutch member. A flange $B^2$ upon this sleeve is bolted to the web $A^2$ of the fixed friction member and between the rim $B^3$ of this flange and the web $A^2$ of the driving member is an annular space in which lies a ball thrust race C. This race abuts against a ring D carrying stems $D^2$ projecting parallel to the axis of the clutch and adapted to carry compression springs E engaging the movable or sliding friction cone F.

The shaft G, which transmits the power of the movable member F and is the driven shaft, is externally splined at $G^2$ and upon these splines slides the operating sleeve H.

This sleeve carries the sliding positive member in the form of a ring J on the sleeve, the periphery of which is serrated or splined at $J^2$. These splines engage the fixed positive element B and are also adapted to engage at all times splines at $F^2$ on the inside of the hub of the movable friction member F. By this latter engagement the movable friction member F is always in rotative engagement with the driven shaft through the splines $G^2$.

The dimensions of the splined ring J on the operating sleeve are such that, as the sleeve H is withdrawn (to the right in the figure), the positive clutch members J and B are first disengaged and then, after a slight further movement, the side $J^3$ of the ring engages a face $F^3$ on the movable friction member F, withdrawing this.

As the operating sleeve H is returned (to the left in the figure), it first allows the friction member F to engage and then the positive elements J and B engage one another, but at no time do the splines on the operating sleeve H disengage the splines $F^2$ on the movable friction member.

Thus there is a direct positive connection between the two friction members through the medium of the splined ring J when the clutch is in engagement.

The operating sleeve H carries a ball race L through which the withdrawal fork takes effect.

By this means a very simple construction is provided.

What we claim as our invention and desire to secure by Letters Patent of the United States is:—

1. In combination, a shaft, a non-sliding member encircling the shaft axis, and clutch means between said shaft and said member, comprising a sleeve slidable on the shaft, splined thereto and having splines on its exterior circumferential surface, a friction clutch member slidably mounted on the sleeve and engaging frictionally the non-sliding member, said non-sliding member and friction clutch member having interior splines engaged by the exterior splines on the sleeve, the said sleeve when retracted disengaging its splines from those of the non-sliding member, but maintaining engagement with the splines of the friction clutch member at all times, said sleeve when fully retracted engaging the friction clutch member to disengage it from the non-sliding member, substantially as described.

2. In combination, a shaft, a non-sliding member encircling the shaft axis and consisting of a web and an overhanging portion, said member having a sleeve on its inner side, a sleeve slidably mounted on and splined to the shaft, and having an enlarged ring portion at one end, said ring portion and the sleeve of the non-sliding member being connected by splines, a conical clutch member mounted on the slidable sleeve and having a friction surface to engage the interior of the overhanging portion of the non-sliding member, said conical portion carrying a ring provided with splines to be engaged by the splines on the enlarged ring shaped portion of the sliding member, springs for pressing the conical portion into frictional engagement with the overhanging part of the non-sliding member, and means for operating the sleeve along the shaft, said sleeve when retracted disengaging its splines from the sleeve of the non-sliding member, but maintaining its splined connection with the ring portion of the conical member, the said sliding sleeve having a portion to contact with a portion of the conical member when fully retracted to retract the friction surface of the conical member from the non-sliding member against tension of the springs, substantially as described.

3. In combination, a shaft, a non-sliding member encircling the axis of the shaft, a sliding sleeve splined to the shaft and having a detachable splined connection with the non-sliding member, a friction clutch member slidably mounted on the sleeve and having splines to be engaged by the splines of the said sleeve when in either retracted or advanced position, springs for pressing the friction clutch member in contact with the non-sliding member, a ball race mounted on the non-sliding member, and a ring with anti-friction balls between it and the ball race, and bolts connected with the ring and the springs, substantially as described.

In testimony whereof we have signed our names to this specification in the presence of two subscribing witnesses.

LOUIS COATALEN.
HERBERT CHARLES MACLEOD STEVENS.

Witnesses:
JOSEPH BEDDOWS,
GEORGE F. MORTIMER.